Sept. 22, 1936.　　　　V. D. SHOUP　　　　2,054,888

CARD GAME

Filed Sept. 15, 1934　　　2 Sheets-Sheet 1

| 1. ANY TIME / SINGLE / RUNNERS (IF ANY) ADVANCE ONE BASE BATTER ON FIRST | 2. WHEN RUNNERS ON FIRST AND SECOND. BATTER IS HIT BY PITCHED BALL / BASES ARE LOADED | 3. ANY TIME / SINGLE / RUNNERS (IF ANY) ADVANCE ONE BASE BATTER IS ON 1ST. | 4. WHEN RUNNERS ARE ON FIRST-AND-THIRD / BATTER WALKS / BASES ARE LOADED |
|---|---|---|---|
| 5. WHEN BASES ARE LOADED / PITCHER FUMBLES A BUNT / RUNNER SCORES FROM THIRD BASES ARE STILL LOADED | 6. WHEN A RUNNER IS ON SECOND / GROUNDER TO SHORTSTOP AN ERROR / RUNNERS ON FIRST AND THIRD. | 7. WHEN BASES ARE EMPTY / SINGLE / BATTER IS ON FIRST | 8. ANY TIME / BALL / RUNNERS (IF ANY) HOLD THEIR BASES. |
| 9. WHEN A RUNNER IS ON FIRST. / HIT AND RUN SINGLE TO RIGHT CENTER / PUTS RUNNERS ON FIRST AND THIRD | 10. WHEN A RUNNER IS ON FIRST / TWO BASE HIT / RUNNER SCORES / BATTER IS ON SECOND | 11. WHEN RUNNERS ARE ON FIRST AND SECOND / THREE BASE HIT / RUNNERS SCORE BATTER IS ON THIRD | 12. WHEN A RUNNER IS ON THIRD / SACRIFICE FLY TO DEEP CENTER / BATTER IS OUT RUNNER SCORES |
| 13. WHEN A RUNNER IS ON SECOND / SINGLE / RUNNER SCORES BATTER IS ON FIRST. | 14. ANY TIME / SINGLE / RUNNERS (IF ANY) ADVANCE ONE BASE BATTER IS ON FIRST. | 15. WHEN RUNNERS ARE ON SECOND AND THIRD / SINGLE TO LEFT FIELD / RUNNERS SCORE BATTER IS ON FIRST | 16. WHEN RUNNERS ARE ON FIRST AND THIRD / DOUBLE STEAL / RUNNER SCORES FROM THIRD OTHER RUNNER GOES TO SECOND |
| 17. WHEN BASES ARE EMPTY / SINGLE / BATTER IS ON FIRST. | 18. WHEN A RUNNER IS ON THIRD / SQUEEZE PLAY / RUNNER SCORES BATTER SAFE AT FIRST. | 19. WHEN ONE OR MORE RUNNERS ARE ON BASES / HOME RUN. / EVERYBODY SCORES | 20. ANY TIME / BALL / RUNNERS (IF ANY) HOLD THEIR BASES |
| 21. ANY TIME / BALL / RUNNERS (IF ANY) HOLD THEIR BASES | 22. WHEN ONE OR MORE RUNNERS ARE ON BASES / SACRIFICE BUNT / RUNNERS ADVANCE ONE BASE BATTER IS OUT. | 23. ANY TIME / TWO BASE HIT / RUNNERS (IF ANY) ADVANCE THREE BASES | 24. ANY TIME / BALL / RUNNERS (IF ANY) HOLD THEIR BASES |
| | 25. WHEN A RUNNER IS ON FIRST / SINGLE OVER SHORTSTOP PUTS RUNNERS ON FIRST AND SECOND. | 26. WHEN A RUNNER IS ON SECOND / TWO BASE HIT / RUNNER SCORES BATTER IS ON SECOND. | |

Fig. 1.

INVENTOR.
Vernon D. Shoup
By Louis C. Vanderlip
ATTORNEY.

Sept. 22, 1936.                V. D. SHOUP                2,054,888
                                CARD GAME
                     Filed Sept. 15, 1934        2 Sheets-Sheet 2

| 27 ANY TIME<br><br>STRIKE<br><br>RUNNERS (IF ANY) HOLD THEIR BASES | 28 WHEN<br>A RUNNER IS ON THIRD<br>GROUNDER TO RIGHT OF SHORTSTOP<br>RUNNER IS OUT TRYING TO SCORE BATTER SAFE AT 1ST. | 29 WHEN<br>A RUNNER IS ON THIRD<br>BATTER FLIES OUT TO SHORT LEFT FIELD<br>RUNNER STAYS ON THIRD | 30 ANY TIME<br>BATTER FLIES OUT TO 3D BASEMAN<br><br>RUNNERS (IF ANY) HOLD THEIR BASES |
|---|---|---|---|
| 31 WHEN<br>A RUNNER IS ON THIRD<br>BATTER FLIES OUT TO SHORTSTOP<br>RUNNER STAYS ON SECOND | 32 WHEN<br>RUNNERS ARE ON FIRST AND THIRD<br>SLOW GROUNDER TO FIRST BASEMAN<br>RUNNERS ADVANCE ONE BASE- BATTER IS OUT | 33 ANY TIME<br>POP FLY- CAUGHT BY PITCHER<br><br>RUNNERS (IF ANY) HOLD THEIR BASES | 34 WHEN<br>A RUNNER IS ON FIRST<br>LOW LINE DRIVE CAUGHT BY SECOND BASEMAN<br>RUNNER STAYS ON FIRST |
| 35 WHEN<br>ONE OR MORE RUNNERS ARE ON BASES<br>BATTER FLIES OUT TO CENTER FIELDER<br>RUNNERS HOLD THEIR BASES | 36 WHEN<br>A RUNNER IS ON FIRST<br>INFIELD GROUNDER DOUBLE PLAY<br>RUNNER IS OUT BATTER IS OUT | 37 ANY TIME<br><br>STRIKE<br><br>RUNNERS (IF ANY) HOLD THEIR BASES | 38 ANY TIME<br>BATTER STRIKES OUT<br><br>RUNNERS (IF ANY) HOLD THEIR BASES |
| 39 ANY TIME<br><br>STRIKE<br><br>RUNNERS (IF ANY) HOLD THEIR BASES | 40 ANY TIME<br><br>STRIKE<br><br>RUNNERS (IF ANY) HOLD THEIR BASES | 41 WHEN<br>RUNNERS ARE ON FIRST AND THIRD<br>BATTER FLIES OUT TO THE SHORTSTOP<br>RUNNERS REMAIN ON FIRST AND THIRD | 42 WHEN<br>A RUNNER IS ON SECOND<br>BATTER FLIES OUT TO SHORT CENTER FIELD<br>RUNNER STAYS ON SECOND. |
| 43 WHEN<br>A RUNNER IS ON FIRST<br>BATTER FLIES OUT TO SHORT RIGHT FIELD<br>RUNNER STAYS ON FIRST. | 44 WHEN<br>RUNNERS ARE ON FIRST AND SECOND<br>BATTER STRIKES OUT<br>RUNNERS HOLD THEIR BASES | 45 WHEN<br>RUNNERS ARE ON SECOND AND THIRD<br>BATTER FLIES OUT TO SECOND BASEMAN<br>RUNNERS HOLD THEIR BASES | 46 ANY TIME<br>FOUL FLY CAUGHT BY CATCHER<br><br>RUNNERS (IF ANY) HOLD THEIR BASES |
| 47 WHEN<br>A RUNNER IS ON FIRST<br>ATTEMPTS TO STEAL SECOND BASE<br>RUNNER IS OUT AT SECOND | 48 WHEN<br>ONE OR MORE RUNNERS ARE ON BASES<br>BATTER FLIES OUT TO LEFT FIELDER<br>RUNNERS HOLD THEIR BASES. | 49 WHEN<br>ONE OR MORE RUNNERS ARE ON BASES<br>BATTER FLIES OUT TO RIGHT FIELDER<br>RUNNERS HOLD THEIR BASES | 50 WHEN<br>A RUNNER IS ON SECOND<br>POP FOUL FLY CAUGHT BY FIRST BASEMAN<br>RUNNER STAYS ON SECOND |
| 51 WHEN<br>A RUNNER IS ON FIRST<br>GROUNDER TO THIRD BASEMAN<br>RUNNER IS FORCED OUT AT SECOND BATTER IS SAFE AT FIRST | 52 WHEN<br>BASES ARE LOADED<br>BATTER TAPS TO PITCHER<br>RUNNER IS FORCED OUT AT PLATE BASES STILL LOADED. | | |

Fig. 2.

INVENTOR.
Vernon D. Shoup
BY
Louis C. Vanderlip
ATTORNEYS.

Patented Sept. 22, 1936

2,054,888

UNITED STATES PATENT OFFICE 2,054,888

CARD GAME

Vernon D. Shoup, Middlebury, Ind.

Application September 15, 1934, Serial No. 744,248

2 Claims. (Cl. 273—152)

This invention relates to card games, and particularly to card games relating to the game of base-ball.

The principal object of my invention is to provide a set of cards for playing the game of base-ball, wherein one half of the set is termed the "batters" pack, and the other half of the set is termed the "fielders" pack, and wherein each pack of cards contains one or more cards which can be advantageously or gainfully played arbitrarily at any time and under any situation or condition existing on the playing field.

Another object of the invention is to provide a set of cards for playing the game of base-ball, wherein one half of the set is termed the "batters" pack, and the other half is termed the "fielders" pack, and wherein each pack of cards contains one or more cards which can be played advantageously, or gainfully, only when one or more runners are on bases.

A third object of the invention is to provide a set of fifty two cards for playing the game of base-ball, wherein twenty-six of the cards are termed the "batters" pack and the other twenty six cards are termed the "fielders" pack, and wherein each of said packs of cards contains a plurality of cards which can be advantageously, or gainfully, played arbitrarily at any time, each of said packs also containing a plurality of other cards which can be played advantageously, or gainfully, only when one or more runners are on bases.

Another object is to provide a set of cards for playing the game of base-ball, wherein one half of the set is termed the "batters" pack, and the other half thereof, the "fielders" pack, and wherein certain of the cards of each of the two packs recite the existing condition, or situation, of the game, the play as executed, and the results of the play; this object defining three distinct sets of indicia on each card, as above recited, and being referred to in the specification as the "top", "middle", and "bottom" indicia, respectively.

Other and more specific objects of the invention are mentioned and described herein.

In illustrating my invention all of the fifty two cards, which constitute the two packs of twenty six each, are shown on the accompanying drawings, wherein Figure 1 illustrates the various cards which constitute the "batters" pack; and Figure 2 illustrates the various cards which constitute the "fielders" pack.

Referring to the details of the drawings the numerals 1 to 26 inclusive indicate the twenty six playing cards of the "batters" pack, and numerals 27 to 52 inclusive indicate the twenty six playing cards of the "fielders" pack.

In the play of my improved baseball card game the conventional baseball diamond, which constitutes the playing field, and which is well known in the art, is to be drawn on a sheet of paper, whereon the home plate, the first, second and third bases are indicated and which may be connected by the usual base lines, also well known in the art. Suitable coins, disks, buttons, or the like, may be used to indicate men on bases (base runners), and which are to be placed on the proper base, or bases, and moved from base to base, or to the home plate, as the play on the card, or cards, indicates, and as the game proceeds.

As heretofore stated, the twenty six cards of Fig. 1 of the drawings constitute the "batters", or offensive, pack, and the cards shown in Fig. 2 constitute the "fielders", or defensive pack, making a total of fifty two cards in both packs. It will be evident, after a study of my card game, that additional cards, carrying new plays thereon, could be added to my fifty two card set; but I prefer to make my card game simple and one that arouses much enthusiasm in the players.

Each of the fifty two cards of the set is divided into three parts, viz: "top", "middle", and "bottom", and each of said three parts carries indicia that is important in the play of the game and materially contributing something to every play in the game. The "top" part indicates the exact situation under which the particular card may be played; the "middle" part of the card indicates what happens on that particular play; and the "bottom" part of the card indicates the situation on the playing field after the play is made. For example, in card 1 of the batters pack, the expression "Anytime" constitutes the top part thereof; the expression "single" constitutes the middle part thereof; and the expression "Runners (if any) advance one base—batter on first" constitutes the bottom part of the card. The card 1, thus described, constitutes an "Anytime" card for the reason that it may be played at any time regardless of the situation on the playing field. It will be noted that cards 3, 8, 14, 20, 21, 23 and 24 of the batters pack all belong to the "Anytime" type of card, and they all have the same value as card 1, and that in every instance the "top" part of the card is indicated by the word "Anytime".

In card 2 of the batters pack, which is termed a "when" card, the expression "When runners on first and second" indicates the "top" part of the card; the expression "Batter is hit by pitched ball" indicates the "middle" part of the card; and the expression "Bases are loaded" indicates the "bottom" part of the card. All of the other twenty four cards of the batters pack are similarly designed. It will, therefore, the apparent that the top part of each card indicates the exact situation under which that particular card may be played, although, as heretofore stated, the "Anytime" cards may be played arbitrarily at any time regardless of the situation on the playing field. For example, the card 1 may be played at any time to introduce a single (one base hit) into the play of the game. And the same applies to the remaining "Anytime" cards. The "When" card 2 may be played only when the "top" part thereof, to wit: "When runners on first and second" exactly corresponds with the situation on the playing field. That is, before card 2 can be played, there must be base runners on first and second bases, and it cannot be played, except as discarded, under any other situation existing on the playing field. And when the exact condition defined by the "top" part of the card 2 exists on the playing field, the card may then be played as "Batter is hit by pitched ball" (as defined by the "middle" part thereof) to indicate that the "Bases are loaded" (as provided by the card "bottom" part); and that there are three men on bases due to the batter being hit by a pitched ball.

In the "fielders", or defensive, pack of cards there are also both "Anytime" and "When" cards. And therein the card 27 is an "Anytime" card and consequently may be played at any time to record a "Strike" on the man at bat, as indicated by the "middle" part of that card, the effect thereof being indicated by the "bottom" part of the card, viz: "runners (if any) hold their bases". It will be noted that the cards 30, 33, 37, 38, 39, 40 and 46 of the "fielders" pack are also "Anytime" cards which may be played at any time regardless of the existing situation on the playing field, to handicap or eliminate the batsman on whom the pitcher may be working.

The card 28 of the "fielders" pack is a "When" card which can be played only when a base runner is on third base, the "middle" part of this card specifying a "grounder to right of shortstop", the effect of which is specified by the "bottom" part of said card, to wit: "Runner is out trying to score—batter is safe at first base". It will be noted that there are seventeen other "When" cards in the "fielders" deck, to wit: numbers 29, 31, 32, 34, 35, 36, 41, 42, 43, 44, 45, 47, 48, 49, 50, 51 and 52, each of which can be played only when the condition, or situation, specified by the "top" part of the card corresponds exactly with the situation on the playing field. From the foregoing it will be evident that any "Anytime" card of either of the batters or fielders deck of cards carries "top", "middle", and "bottom" indicia which recites the three features thereof, viz: "anytime", which enables arbitrary play of that particular card; the play as actually executed; and the result, or effect, of the play.

The manner of play

This game must be always played by two sides opposing each other, one side being the player, or players, of the "batters" deck, and the other side, the "fielders" deck. Each "side" may include one or more persons, but the combination which will arouse the maximum of interest and enthusiasm is one composed of two players on each side. If two persons only play this game (one on each side) five or six cards may be dealt to each player. If four persons play the game (two on each side) three cards may be dealt to each player. If six persons play the game (three on each side) two cards may be dealt to each player.

After dealing the cards, as above provided, the remaining cards of each deck, each deck separately, are placed face downward in the center of the table to enable ready access thereto by all of the players. After each play each player draws a card from the deck on the table which he represents. That is, the "batters" player draws only from the batters deck, and the "fielders" player draws only from the fielders deck, so that each of the players always holds the same number of cards with which the game was initiated at the beginning of each half inning. One "side" uses the "batters" deck, or pack, for the first half of an "inning", while the opposition is using the "fielders" deck. In the second, or last, half of the inning this situation is reversed. The cards of each deck should be thoroughly shuffled at the finish of each half inning. The player making the opening play of a game may be determined by lot, or in any other acceptable manner. In each succeeding half inning the opening play may rotate one player to the left.

Preferably, one of the players representing the "batters" side opens the play of the game. For example, that player might open by playing card 1 for a "single" (one base hit) which would place the batter on first base; or by playing card 8 for a "ball", which is advantageous to the batter (the man at bat). After making that initial play the opening player draws one card from the batters deck on the table.

Assuming that the player making the opening play has played card 1, which would place a man on first base, the opposition play by the "fielders" side might logically be card 36 which provides for "infield grounder—double play" at its "middle" part, whereby both the batsman and the base runner are "out", or eliminated from the play. The third play is made by one of the "batters" players (assuming that four players are in the game), and that player might logically play card 23, the "middle" part of which specifies "two base hit", thereby placing a base runner on second base. And such a play might logically be followed by the fourth player (representing the "fielders" deck) playing card 33 which, at the middle part thereof, specifies "pop fly caught by the pitcher", thereby making three men out and retiring the side. If a player does not have an "anytime" or "when" card which meets the exact situation on the playing field he must discard one card, stating thereupon "throwing it away", or "I discard one", and at once draw another card from his deck on the table.

The players may, and should, keep accurate account of the "outs" and "scores" of each inning, as is well known in the baseball art, remembering that, if a batsman makes the third "out", and even if the card played should state that a "runner scores", that such a score does not count, for, technically, the batsman is "out" from the moment the ball left the pitcher's hand. It will be noted that four of the cards of the batter's pack, to wit: Cards 8, 21, 20 and 24, provide for a "ball" at the "middle" part thereof, and occasionally said four cards might be played before an "out" is made, or before another runner gets on base. In such an event a runner should be placed on first base (in accordance with the well known rule which gives the batsman a base on balls), and if this forces the base runner to advance, such advance of a base runner must be made.

In like manner the three cards of the fielder's deck which provide for "strike" at the middle part thereof, to wit: Cards 37, 39 and 40, may be played before another runner gets on base, or before an "out" is made, and in such event an "out" must be recorded against the batter's side. Play may be expedited considerably, when four persons are playing the game, if the first player will always deal the batter's cards; the second player will always deal the fielder's cards; the third player controls the playing field; and the fourth player records the scores.

I claim:

1. A baseball card game comprising two packs of cards, one constituting a batters pack and the other a fielders pack, each card of the batters pack indicating a complete play favoring the team at bat and the cards of the fielders pack indicating complete plays favoring team in the field, certain cards of each pack being playable under different situations from others, three separate legends on each card of each pack, one legend indicating situations in the game when a particular card may be played, another legend indicating a complete simulated play of a baseball game consumated by the playing of a particular card, a third legend indicating the position of base runners if any on completion of the play indicated by a particular card whereby to avoid argument on the point between individuals participating in the game, and said respective legends located on the same relative portion of each of said cards whereby they can be quickly identified by their position on the card and errors avoided.

2. A baseball card game comprising two packs of cards, one constituting a batters pack and the other a fielders pack, each card of the batters pack indicating a complete play favoring the team at bat and each card of the fielders pack indicating a complete play favoring team in the field, certain cards of each pack being playable under different situations from others, at least two separate legends on each card of each pack, one legend indicating situations in the game when a particular card may be played, a second legend indicating the position of base runners if any on completion of the play indicated by a particular card whereby to avoid argument on this point between individuals participating in the game, and said respective legends located on the same relative portion of each of said cards whereby they can be quickly identified by their position on the card and errors avoided.

VERNON D. SHOUP.